United States Patent
Giles et al.

(10) Patent No.: US 6,749,670 B2
(45) Date of Patent: Jun. 15, 2004

(54) PROCESS FOR TRAPPING PARTICULATE MATTER IN HOT GAS AND TRAP THEREFOR

(75) Inventors: Steven Paul Giles, Sugar Land, TX (US); Alex Frederik Woldhuis, Haarlem (NL); Marinus Marcus Wilhelmus Johannes Miggelbrink, The Woodlands, TX (US); James Arther Salter, Katy, TX (US); Charles Phillip Brundrett, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/091,239

(22) Filed: Mar. 5, 2002

(65) Prior Publication Data

US 2002/0148209 A1 Oct. 17, 2002

Related U.S. Application Data

(60) Provisional application No. 60/278,849, filed on Mar. 26, 2001.

(51) Int. Cl.$^7$ .................................................. F23J 15/00
(52) U.S. Cl. ..................... 96/74; 96/57; 95/58; 95/69; 95/73; 423/215.5; 423/535
(58) Field of Search ............................... 95/58, 69, 73, 95/52; 96/57, 74, 18, 52; 423/215.5, 535, 533, 244.09; 285/385.3, 482, 485, 486, 487, 522, 525; 422/160, 177

(56) References Cited

U.S. PATENT DOCUMENTS

| | | | |
|---|---|---|---|
| 3,581,463 A | * | 6/1971 | Roberts .......................... 95/58 |
| 4,065,918 A | | 1/1978 | Rifkin |
| 4,181,514 A | | 1/1980 | Lefkowitz et al. |
| 4,213,947 A | | 7/1980 | Fremont et al. |
| 4,238,455 A | | 12/1980 | Ogiwara |
| 4,327,893 A | | 5/1982 | Bachmann et al. |
| 4,493,311 A | | 1/1985 | Bachmann |
| 4,512,787 A | | 4/1985 | Mathews |
| 4,724,863 A | | 2/1988 | Connor |
| 4,849,185 A | | 7/1989 | Wittig |
| 4,857,276 A | | 8/1989 | Seto et al. |
| 4,904,288 A | | 2/1990 | D'Angereau .................. 55/525 |
| 4,905,662 A | | 3/1990 | Bachmann |
| 5,009,856 A | | 4/1991 | Fenger et al. |
| 5,143,700 A | | 9/1992 | Anguil |
| 5,169,604 A | | 12/1992 | Crothers, Jr. |
| 5,240,470 A | | 8/1993 | Wright |
| 5,318,755 A | | 6/1994 | Kuivalainen et al. |
| 5,332,562 A | | 7/1994 | Kersey et al. |

(List continued on next page.)

FOREIGN PATENT DOCUMENTS

| | | |
|---|---|---|
| DE | 2752833 | 6/1979 |
| DE | 19704147 | 8/1998 |
| EP | 163001 | 12/1985 |
| EP | 304762 | 3/1989 |
| EP | 318934 | 6/1989 |
| JP | 52-37557 | 3/1977 |
| JP | 53-144869 | 12/1978 |
| WO | 97/12653 | 4/1997 |

OTHER PUBLICATIONS

Patent Abstract of Japan, vol. 003, No. 003 (C–033), Jan. 16, 1979, JP 53125964A (Nippon Steel Corp.), Nov. 2, 1978.
EPO Search Report dated Jul. 16, 2002.
Research Disclosure No. 13810—Exhaust Gas Catalytic Treatment System (Class FO2).

*Primary Examiner*—Minh-Chau T. Pham

(57) ABSTRACT

There is provided a process for trapping particulate matter in a gas stream exiting a combustion equipment comprising providing a combustion equipment with one or more exits for exhaust gases, each exit connected to one or more ducts, and placing at least one particulate trap in each duct, wherein the particulate trap is removable and/or replaceable while the combustion equipment is online.

16 Claims, 2 Drawing Sheets

U.S. PATENT DOCUMENTS

| | | |
|---|---|---|
| 5,336,471 A | 8/1994 | Brophy et al. |
| 5,356,597 A | 10/1994 | Wright et al. |
| 5,547,495 A | 8/1996 | Wright |
| 5,601,626 A | 2/1997 | Hori et al. |
| 5,603,742 A | 2/1997 | Nagashima et al. |
| 5,711,509 A | 1/1998 | Yates |
| 5,746,986 A | 5/1998 | Pollock et al. |
| 5,776,417 A | 7/1998 | Frost et al. |
| 5,853,437 A | 12/1998 | Peter et al. ............ 55/525 |
| 6,027,697 A | 2/2000 | Kurihara et al. |
| 6,063,150 A | 5/2000 | Peter et al. ............ 55/525 |
| 6,096,117 A | 8/2000 | Lisson et al. ............ 55/525 |

* cited by examiner

PROCESS FOR TRAPPING PARTICULATE MATTER IN HOT GAS AND TRAP THEREFOR

This application claims the benefit of U.S. Provisional Application No. 60/278,849 filed Mar. 26, 2001, the entire disclosure of which is hereby incorporated by reference.

FIELD OF THE INVENTION

This invention relates to a process for trapping particulate matter in gas streams exiting combustion equipment, particularly gas streams which further pass through a catalytic system. This invention also relates to a trap for use in such a process.

BACKGROUND

Current technology for removal of oxides of nitrogen ($NO_x$), organic compounds, carbon monoxide, dioxins and other environmentally undesirable pollutants, including combinations thereof, from high temperature gas streams (>150° C.) many times makes use of catalyst wherein the gas stream is passed over relatively small diameter catalyst pellets. The catalyst pores and void spaces between catalyst particles can become fouled with particulate matter carried in the gas stream. As the catalyst pores and void spaces fill with particulate matter, a pressure drop occurs and eventually this pressure drop becomes excessive, such that the process equipment moving the gas through the system cannot maintain the required flow rate. When this occurs, the flow must be stopped so the catalyst can be cleaned or replaced.

In very severe cases particulate clogging may result in a time in service for a catalyst system which is less than the typical time between maintenance shutdowns for the combustion equipment associated with it. Such an interruption produces a considerable impact on the overall combustion equipment reliability and time on line.

The typical sources of particulate matter are rust, dust soot, insulation fibers or particles, and metal flake from the combustion equipment. It is therefore an object of the invention to remove particulate matter upstream of the catalyst. This in turn will allow the combustion equipment producing or handling hot gas streams to remain in service between scheduled shutdowns.

SUMMARY OF THE INVENTION

There is provided a process for trapping particulate matter in a gas stream exiting combustion equipment, said process comprising:
  providing a combustion equipment with one or more exits for exhaust gases, each said one or more exits connected to one or more ducts; and
  placing at least one particulate trap in at least one of said one or more ducts;
  wherein said at least one particulate trap is removable and/or replaceable while said combustion equipment is online.

There is further provided a process for trapping particulate matter from a gas stream exiting combustion equipment, said process comprising:
  providing a combustion equipment with one or more exits for exhaust gases, each said one or more exits connected to one or more ducts; and
  placing at least one particulate trap in at least one of said one or more ducts;
  wherein said at least one particulate trap is cleanable while said combustion equipment is online.

There is also provided a particulate trap for removing particulate matter from a gas stream, said particulate trap comprising:
  a plurality of filtering layers, each layer having a mesh or pore size; and
  a housing to contain said layers in a predetermined shape.

DETAILED DESCRIPTION

Figure 1:
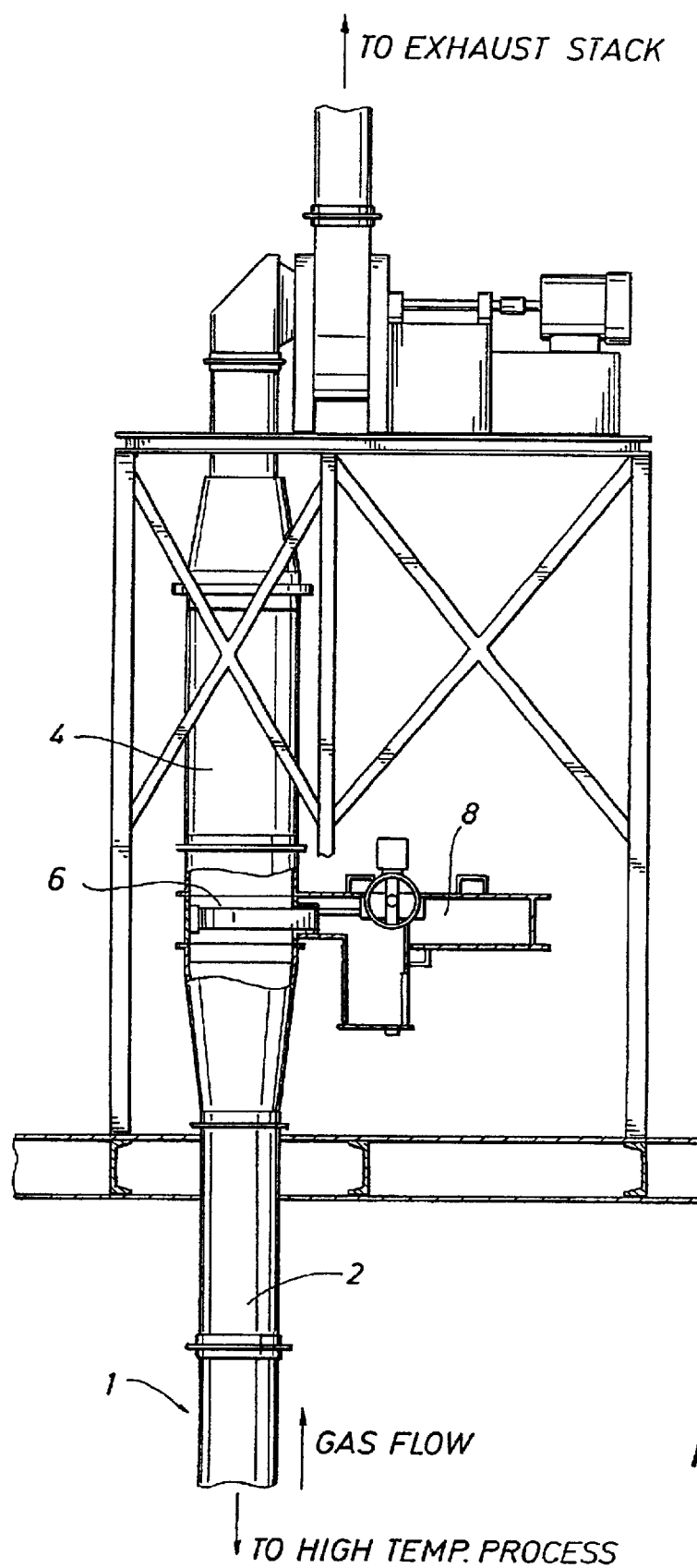
FIG. 1 shows a typical combustion equipment duct system, including placement of the particulate trap assembly of the invention.

As used herein "particulate trap" means a filtering medium designed for continuous use in gas streams containing lower concentrations of particulate.

As used herein "mesh size" may be used to also mean pore size or cell size or any of them.

The invention first provides a process for filtering a gas stream exiting combustion equipment. Although the system will work on low and high temperature systems, the higher temperature systems (>150° C.) are known to sometimes contain particulate matter and are of particular interest. Examples of combustion equipment as used herein include combustion equipments, turbines, boilers, engines, incinerators and chemical processes. Combustion equipment of the type using the process has one or more exits for exhaust gases, each of these connected to one or more ducts. The ducts eventually connect to a stack, which allows the gases to be released. In the process of the invention, the gases must first be cleaned to meet environmental concerns, and this cleaning typically takes place somewhere in the duct.

In the process of the invention, at least one particulate trap is placed in at least one of the one or more ducts. Typically, at least one particulate trap will need to be placed in each duct coming off of the combustion equipment. The particulate trap is removable and/or replaceable while the combustion equipment is online. This is accomplished, for example, by using an assembly comprising a particulate trap installed in a sliding-gate valve wherein the sliding gate is removed and the particulate trap is seated in its place. Examples of sliding-gate valves which are useful in the invention include guillotine damper or isolation valves such as the Wahlco WGD Guillotine Damper, manufactured by WahlcoMetroflex, Inc., and the PEP Series 220 Guillotine, manufactured by Precision Engineered Products, Inc. This allows for on-line particulate trap maintenance without interruption to the hot gas flow stream and equipment shutdown. The particulate trap assembly is intended for use in high-volume, high-temperature gas stream services that will not allow for discontinuation of flow when filter media change-out or cleaning is necessary due to excessive pressure differential across dirty particulate traps. The valve used is sized to fit the cross-section of the duct in the area in which it is to be installed, with the valve control mechanism outside the wall of the duct. To remove/replace the particulate trap, the valve is opened, causing the particulate trap to be moved into the bonnet area outside the duct for easy cleaning and/or replacement.

Features of such an assembly are that it allows a particulate trap to be placed into short sections of ductwork and, further, to operate at high temperatures. The assembly is positioned within the duct such that opening or retracting the sliding-gate housing moves the particulate trap into the valve bonnet outside the duct, allowing particulate trap removal and/or replacement while the combustion equipment remains online. As the process can be accomplished in a relatively short time, little particulate matter typically gets carried downstream during the time the particulate trap is outside the duct. As already described, a commercially available gate valve may be slightly modified for use as the particulate trap housing by replacing the sliding-gate (also known as the blade or door or guillotine) with the particulate trap assembly. In use, the valve is opened, lifting the particulate trap into the valve bonnet, outside the duct. When fully opened, the bottom of the valve stem seals the duct, allowing the combustion equipment to continue in operation. The particulate trap may then be retrieved from the bonnet, or cleaned within the bonnet. If retrieved from the bonnet, the dirty particulate trap is lifted out cleaned and/or a clean particulate trap is fitted into the housing in the dirty trap's place and the sliding-gate is closed, allowing flow to continue again through the trap. The entire process takes a short period of time.

In a preferred embodiment, the particulate trap assembly is upstream of an environmental reactor catalyst bed. The filter media of the trap is then sized to capture particles which may foul the catalyst bed system. The filter media can be modified such that varying filtration efficiency and/or particulate trap pressure drop requirements can be achieved as required for varying applications.

In another embodiment of the process, the particulate trap is not necessarily removed, but is cleaned in place. Also a combination of a removal system and a cleaning system may be used. In the cleaning embodiment, the particulate traps are cleanable while the combustion equipment is online. A typical way of accomplishing this is to provide one or more spray nozzles near each particulate trap such that a stream of cleaning media from the spray nozzle impinges upon one or more particulate traps. Cleaning media can be selected from steam, liquids, gases, and combinations thereof.

A particulate trap useful in the invention is sized to fit the sliding-gate housing, so is typically rectangular-shaped. A panel particulate trap is preferred. The entire assembly is sized to fit within, typically, already installed ductwork. The particulate trap assembly includes the particulate trap and a sliding-gate valve. Once the sliding-gate valve is installed in the ductwork, the particulate trap may be placed into the gas stream, or removed from the duct for cleaning, without disruption to the gas flow by simply opening or closing the valve.

Filtering media for the particulate trap is chosen based upon several criteria. A first criteria is the type of combustion system and the typical particulate matter found in such a combustion system exhaust stream. A second criteria is the type of catalyst being used and what size particulate can pass through the catalyst without causing any clogging problems.

Although a single layer particulate trap may be used, the preferred particulate trap comprises a plurality of filtering layers, each layer having a mesh size, pore size or cell size. The housing of the particulate trap contains the layers in the predetermined shape desired as already herein discussed.

It is preferred that at least two layers of the plurality of layers have different media sizes. For example, the particulate trap may comprise three layers, two having a media capable of capturing particles larger particles (e.g., a mesh size of 100) and one layer having a media capable of capturing smaller particles (e.g., a mesh size of 300) sandwiched between the larger particle capturing layers.

The particulate trap may be made from any material capable of filtering particles and withstanding the temperature of the duct when the system is online, such as metal, ceramic, foam, fiberglass or other fiber, graphite, felt or TEFLON®. It has been found effective to use sintered weave material for the filter layers. It has also been found effective to have multiple pleated filtering layers wherein multiple layers have a large mesh size and at least one layer, sandwiched between other layers, has a smaller mesh size. As already discussed, the larger and smaller mesh sizes are chosen based upon the typical particulate matter present and the maximum size particle capable of passing through the catalyst.

Referring now to FIG. 1, a typical duct system 1 is shown coming off combustion equipment (not shown). In this example, the duct 2 contains an environmental catalyst system 4. The particulate trap assembly 6, which here is a sliding-gate valve with a particulate trap in place of the gate, is placed in the duct downstream from the combustion equipment and upstream from the catalyst system 4. Bonnet access 8 outside the duct allows access to the particulate trap 6 for replacement or cleaning.

Figure 2:
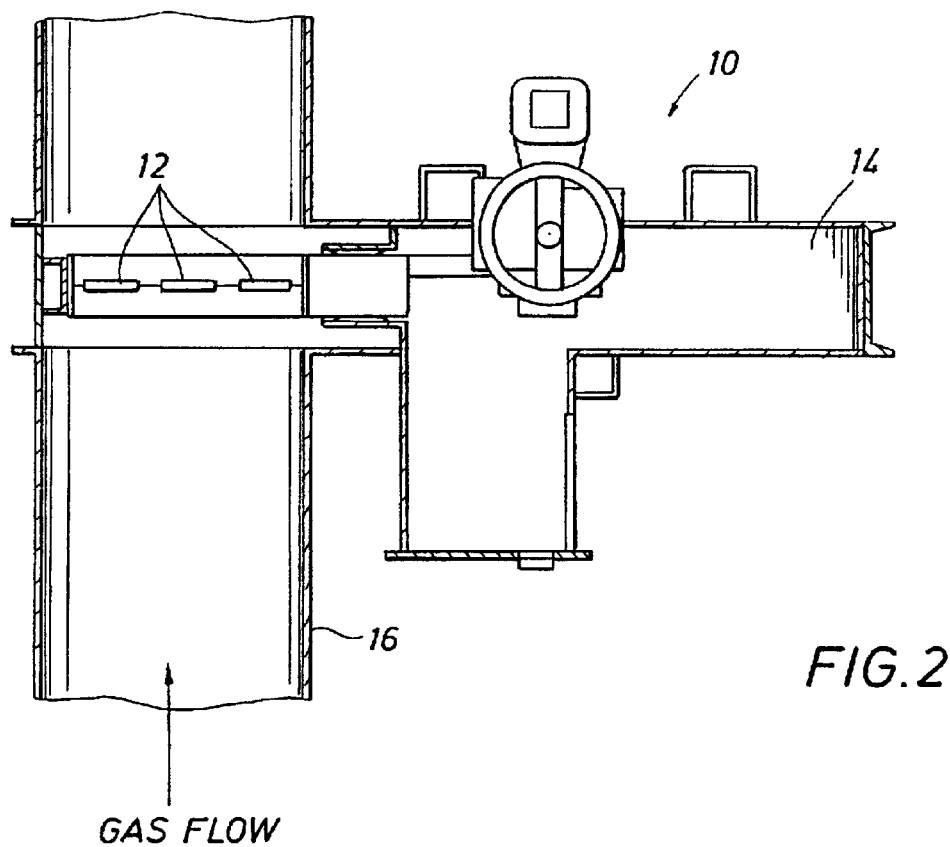
FIG. 2 shows a sliding-gate version of the particulate trap assembly.

FIG. 2 shows the sliding-gate particulate trap assembly 10. A commercial gate valve is chosen, depending upon the size of the duct. One or more particulate traps 12 are placed in the assembly at the location where the gate is typically found. The bonnet 14 is outside the wall of the duct 16. Turning the bonnet lifts the particulate trap(s) out of the duct for cleaning/replacement. Flow is not restricted during the particulate trap replacement process.

Figure 3:
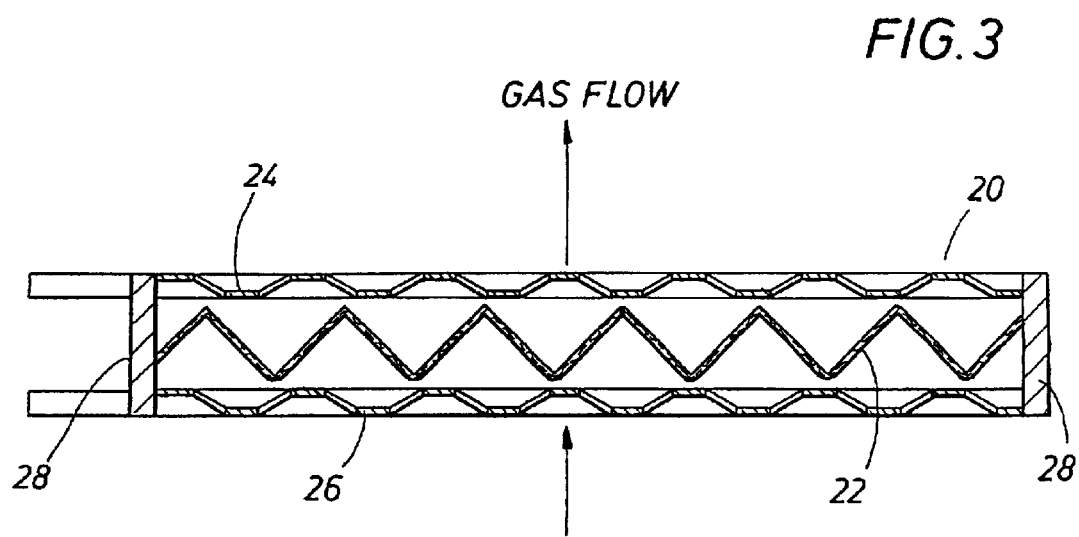
FIG. 3 shows a cross-sectional view of a particulate trap useful in the invention.

FIG. 3 shows a cross-sectional view of a preferred embodiment of a particulate trap 20. The filter medium 22 is a pleated system with one or more layers. If greater than one layer, the layers are stacked. An outer housing maintains the filter layers in a predetermined shape. It has been found useful to include structural members for the top and bottom 24, 26 of the housing, such as use expanded metal or wire gauze which provide structural support without restricting air flow. The sides 28 of the housing may be made from any easily formable material.

Other embodiments of the invention will be apparent to those skilled in the art from a consideration of this specification or from practice of the invention disclosed. It is intended that the specification be considered as exemplary only, with the true scope and spirit of the invention being indicated by the following claims.

We claim:

1. A process for treating a combustion gas stream, said process comprises:

passing said combustion gas stream, which comprises particulate matter, through a duct that is in fluid flow communication with a combustion equipment, wherein said duct defines a cross-section and is fitted with assembly means, wherein said assembly means comprises a particulate trap and a sliding-gate housing, wherein said assembly means provides for the placement of said particulate trap in said duct and the removal of said particulate trap from said duct while said combustion equipment is online;

passing said combustion gas stream through said particulate trap to thereby remove said particulate matter from said combustion gas stream to provide a filtered gas stream;

passing said filtered gas stream over an environmental reactor catalyst bed contained in said duct downstream from said particulate trap to thereby provide a clean gas stream; and passing said clean gas stream to a stack for release.

2. A process as recited in claim 1, wherein said particulate trap further comprises:

a plurality of filtering layers, each layer having a mesh size, contained in a housing to provide a predetermined shape.

3. A process as recited in claim 2, wherein said plurality of filtering layers includes two filtering layers having a first media to catch larger particles, wherein said plurality of filtering layers further includes one filtering layer having a second media to catch smaller particles, and wherein said one filtering layer having said second media is sandwiched between said two filtering layers having said first media.

4. A process as recited in claim 3, wherein each filtering layer of said plurality of filtering layers is a sintered weave material.

5. A process as recited in claim 4, wherein each filtering layer of said plurality of filtering layers is a pleated filtering layer.

6. A process as recited in claim 1, wherein said assembly means comprises a sliding-gate value having a sliding gate that has been removed therefrom and replaced therewith said particulate trap.

7. A process as recited in claim 1, wherein said particulate trap further comprises:

a plurality of filtering layers, each layer having a mesh size, contained in a housing to provide a predetermined shape.

8. A process as recited in claim 7, wherein said plurality of filtering layers includes two filtering layers having a first media to catch larger particles, wherein said plurality of filtering layers further includes one filtering layer having a second media to catch smaller particles, and wherein said one filtering layer having said second media is sandwiched between said two filtering layers having said first media.

9. A process as recited in claim 8, wherein each filtering layer of said plurality of filtering layers is a sintered weave material.

10. A process as recited in claim 9, wherein each filtering layer of said plurality of filtering layers is a pleated filtering layer.

11. A process as recited in claim 1, further comprising:

cleaning said particulate trap while in place is said duct by spraying a cleaning media upon said particulate trap.

12. A process as recited in claim 11, wherein said particulate trap further comprises:

a plurality of filtering layers, each layer having a mesh size, contained in a housing to provide a predetermined shape.

13. A process as recited in claim 12, wherein said plurality of filtering layers includes two filtering layers having a first media to catch larger particles, wherein said plurality of filtering layers further includes one filtering layer having a second media to catch smaller particles, and wherein said one filtering layer having said second media is sandwiched between said two filtering layers having said first media.

14. A process as recited claim 13, in wherein each filtering layer of said plurality of filtering layers is a sintered weave material.

15. A process as recited in claim 14, wherein each filtering layer of said plurality of filtering layers is a pleated filtering layer.

16. A process as recited in claim 15, wherein said assembly means comprises a sliding-gate value having a sliding gate that has been removed therefrom and replaced therewith said particulate trap.

* * * * *